United States Patent
Knight et al.

(10) Patent No.: US 7,565,663 B2
(45) Date of Patent: Jul. 21, 2009

(54) AUTOMATED DATA ORGANIZATION

(75) Inventors: Holly Knight, Woodinville, WA (US);
Praveen Seshadri, Bellevue, WA (US);
Katica Iceva, Bellevue, WA (US);
Shahaf Abileah, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/203,741

(22) Filed: Aug. 15, 2005

(65) Prior Publication Data

US 2006/0195850 A1 Aug. 31, 2006

Related U.S. Application Data

(60) Provisional application No. 60/657,519, filed on Feb. 28, 2005.

(51) Int. Cl.
*G06F 9/46* (2006.01)
*G06F 9/54* (2006.01)

(52) U.S. Cl. .............................. 719/318; 719/320

(58) Field of Classification Search ................ 719/320, 719/318

See application file for complete search history.

(56) References Cited

U.S. PATENT DOCUMENTS

| 5,751,914 | A | | 5/1998 | Coley et al. | |
| 5,925,108 | A | * | 7/1999 | Johnson et al. | 719/318 |
| 5,966,707 | A | * | 10/1999 | Van Huben et al. | 707/10 |
| 6,061,740 | A | * | 5/2000 | Ferguson et al. | 709/246 |
| 6,272,559 | B1 | * | 8/2001 | Jones et al. | 719/330 |
| 6,332,163 | B1 | * | 12/2001 | Bowman-Amuah | 709/231 |
| 7,240,072 | B2 | * | 7/2007 | McKnight et al. | 707/103 Y |
| 2002/0019886 | A1 | * | 2/2002 | Sanghvi et al. | 709/318 |
| 2006/0129584 | A1 | * | 6/2006 | Hoang et al. | 707/101 |

FOREIGN PATENT DOCUMENTS

WO 9940512 A 5/1999

OTHER PUBLICATIONS

Maes Pattie. Agents that reduce work and information overload. Communications of the Association for Computing Machinery, ACM, New York, NY, US, vol. 37, No. 7, Jul. 1994, pp. 30-40. XP002193398.
European Search Report for European Patent Application No. EP06100839 dated Nov. 23, 2007, 3 pages.

* cited by examiner

*Primary Examiner*—Li B Zhen
(74) *Attorney, Agent, or Firm*—Workman Nydegger

(57) ABSTRACT

A system for automating data processing is presented. The system comprises an end-user programming module that is integrated with an underlying file system and that maps an event of a computing system to at least one automatic action that is defined by an end user. The system also includes an event handler that responds to events and causes the at least one automatic action to be performed. Methods of using the system are also provided.

18 Claims, 12 Drawing Sheets

AUTOMATED DATA ORGANIZATION

CROSS-REFERENCE TO RELATED APPLICATION

This is an application claiming benefit under 35 U.S.C. § 119(e) of U.S. Provisional Patent Application Ser. No. 60/657,519 entitled "AUTOMATED DATA ORGANIZATION" and filed on Feb. 28, 2005. The entirety of the aforementioned application, including all attachments or exhibits thereto, is hereby incorporated by reference.

BACKGROUND

Modern computing systems can include many software processes active at any one time in various states of execution. These processes can be initiated by an operating system, can monitor or service processes that are initialized at start time or upon launching a user application, or can be a user application itself. Many, if not most of these processes or features of these processes, are beyond the ability of a user to control directly. Therefore, if functionality offered by these processes is to be accessed at all, such access usually typically must be accomplished by another software process.

Software applications manage information on behalf of end users. The number of software applications or processes running on a computing system is generally a function of the amount of data the system must process and the number of tasks the system is called upon to perform. The least efficient parts of these computing duties are the ones that require human interaction. Despite increasingly powerful machines, end users typically have to manually process a great deal of computerized information.

One major component of a general computing system is a storage device such as a hard disk drive, which is commonly used for persistent storage of electronic information such as data files and executable programs. To organize electronic information so that it can be located and retrieved in a usable form, a file system can be employed. Many file systems exist but generally all provide a conceptual organizational layer for the format and location of information on a storage device.

The conceptual organizational layer provided by a file system can be employed by software processes like those of an operating system to create, access, retrieve, delete, and otherwise manage information stored on the storage device. To protect integrity of the file system and ensure adherence to the format of the file system, generally only certain privileged software processes like input-output processes of an operating system are allowed direct access to the file system. Applications and users that access a file system generally must do so through functions provided by the operating system. These functions are usually hidden from the view of end users who may not even know of the existence of these functions. Commonly, this restricted access results in an inability of a user to fully exploit features of the file system to make computing tasks easier, for example, by using attributes of the file system to automate tasks such as file organization or location.

Generally, an end user manages information on his/her computer according to an information life cycle. During that life cycle, the end user usually creates information or obtains information from some source, and the information is then stored in a file system. At some point, the end user retrieves the information and takes action based on that information—this cycle can be repeated many times. Current systems do no provide for an end user to automate portions of this life cycle in ways that are efficient and personalized to the needs of the end user.

SUMMARY

The following presents a simplified summary in order to provide a basic understanding. This summary is not an extensive overview. It is neither intended to identify key/critical elements nor to delineate scope. Its sole purpose is to present some concepts in a simplified form as a prelude to the more detailed description later presented. Additionally, section headings used herein are provided merely for convenience and should not be taken as limiting in any way.

An end-user programming module provides a capability for end users of a computing system to identify events that can serve as triggers for one or more user-defined actions. The end users can, by using the module, define data processing tasks to be automatically performed upon the occurrence of a chosen event. These data processing tasks can include file organization and file filtering for attributes or content, among other tasks. Performance of such tasks may be performed by one or more components of the computing system. Thus, by way of the end-user programming module, users can generate customized end user programs that aid in storage and organization of data.

End user programs created with an end-user programming module can be created from one or more basic types, which can be combined to form complex entities that can be used to perform tasks. Basic types can be further combined with other components to perform more complicated tasks. The actions to be performed can be triggered automatically by a preselected event without the need for the end user to initiate the actions or interact with a computing system while the tasks are being performed. Therefore, rather than being forced to review data and make decisions regarding where to store such data, a user can, through utilization of the aforementioned basis types, cause such data to be automatically filtered and stored in a desirable location. Furthermore, actions can be automatically undertaken upon occurrence of an event (such as receipt of data). In one example, the user can specify that each time an email message from a particular individual is received an instant messaging application will be invoked and an instant message will be delivered to a particular contact. Thus, it can be discerned that specified actions can occur across disparate applications through utilization of the basic types (or combination of basic types). In another example, the actions defined by a user can be explicitly invoked by a command from an end user.

To aid usability, an end user programming system can be integrated with a file system to provide a uniform interface to information stored on a computing system. Integration between the end-user programming module and the file system provides an ability for an end user to define rules and actions to be taken on stored data, wherein rules can be applied and actions taken on the data with or without user interaction. This type of end user programming system can provide an end user with the ability to manage data using functions of the underlying file system that otherwise would be hidden and which the end user would be prohibited from accessing.

The disclosed and described components and methods comprise the features hereinafter described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such components, methods and their equivalents. Variations of the specific implementations and examples presented herein will become apparent from the following detailed description when considered in conjunction with the drawings.

DETAILED DESCRIPTION OF THE INVENTION

Figure 1:
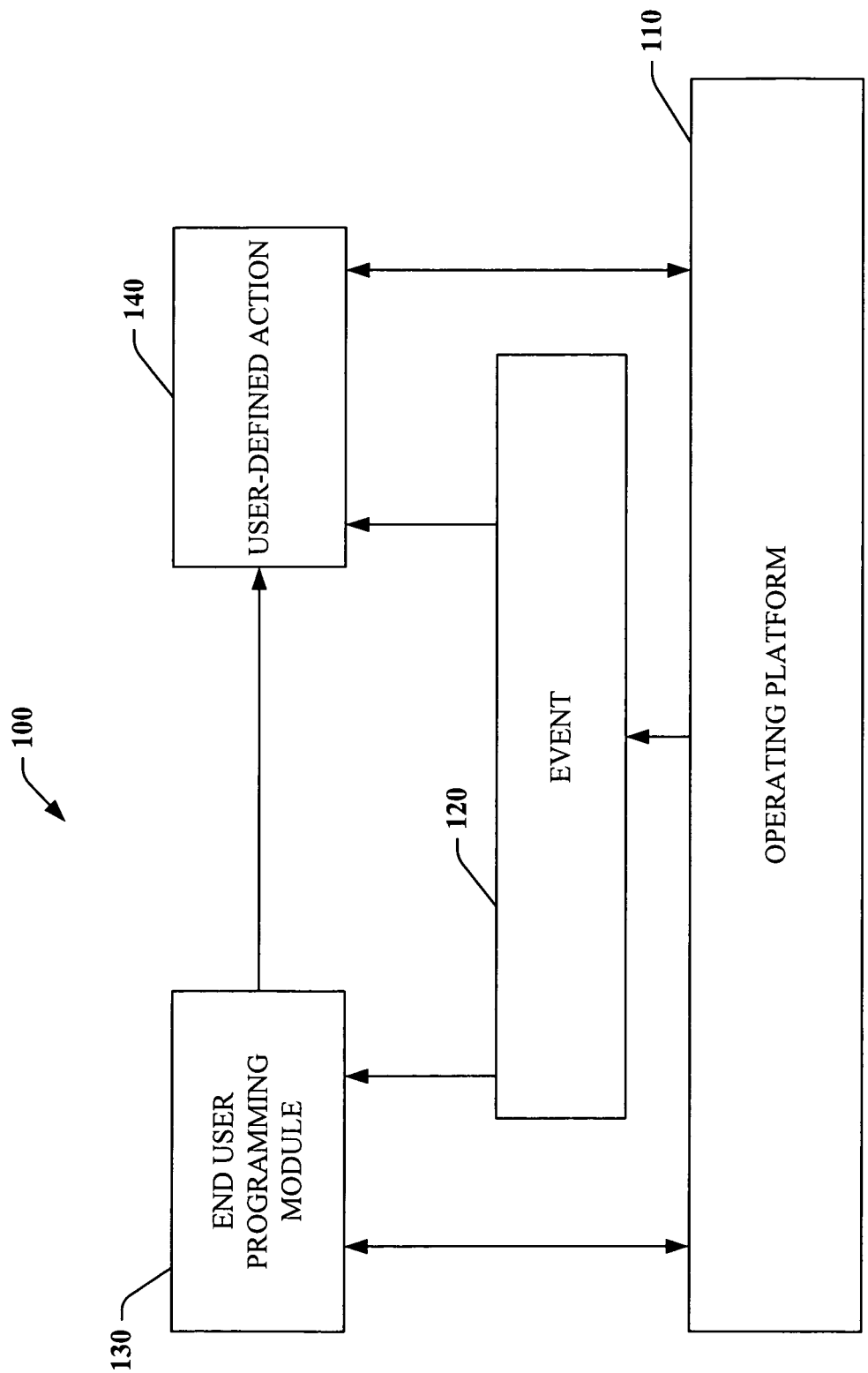
FIG. 1 is a system block diagram of an end-user programming system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

Artificial intelligence based systems (for example, explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems for example, support vector machines, neural networks, expert systems, Bayesian belief networks, fuzzy logic, and data fusion engines, among others, can be employed in connection with performing automatic and/or inferred action in connection with the components and methods disclosed and described herein.

FIG. 1 is a system block diagram of an end user programming system 100. The end user programming system 100 includes an operating platform 110, which can provide a processing environment for the end user programming system 100. In this context, the operating platform 110 can include both hardware and software components. Specifically, the operating platform 110 can be an operating system for a personal computer, a workstation, or a server. An event 120 can be created by the operating platform 110, wherein the event 120 can serve as an indicator that a processing task is being or has been performed. An event such as the event 120 can be detected by other computing components and can be used as a triggering device to initiate execution of a predefined computing task.

An end-user programming ("EUP") module 130 can provide a component that can be operated by an end user to define an action, such as a user-defined action 140, to be taken upon the occurrence of the event 120. It should be noted that the user-defined action 140 can be a single task or can be a group of tasks to be performed. The EUP module 130 can provide an interface to system functions that can be operated manually or previously could only be accessed by other software components such as, but not limited to, an operating system or a service component.

In operation, an end user accesses the EUP module 130 to identify an event, such as the event 120, that can be used to trigger a user-defined action. The end user also defines an action or group of actions that the end user wants the system to execute automatically upon the occurrence of the identified event. The event is then bound to the user-defined action—in other words, upon occurrence of the event 120, the operating platform performs the user-defined action.

For example, an end user can identify reception of an email message from a particular person as a triggering event. The end user can then create an action so that upon receipt of such an email message, the message is transferred to a defined mailbox folder, a reply verifying receipt of the message is sent to the sender, a document is retrieved from a file server and opened in an appropriate program, and an audible alert sounds to notify the user that the document is ready on the computer. These steps can be performed automatically without user intervention through utilization of the system 100.

Figure 2:
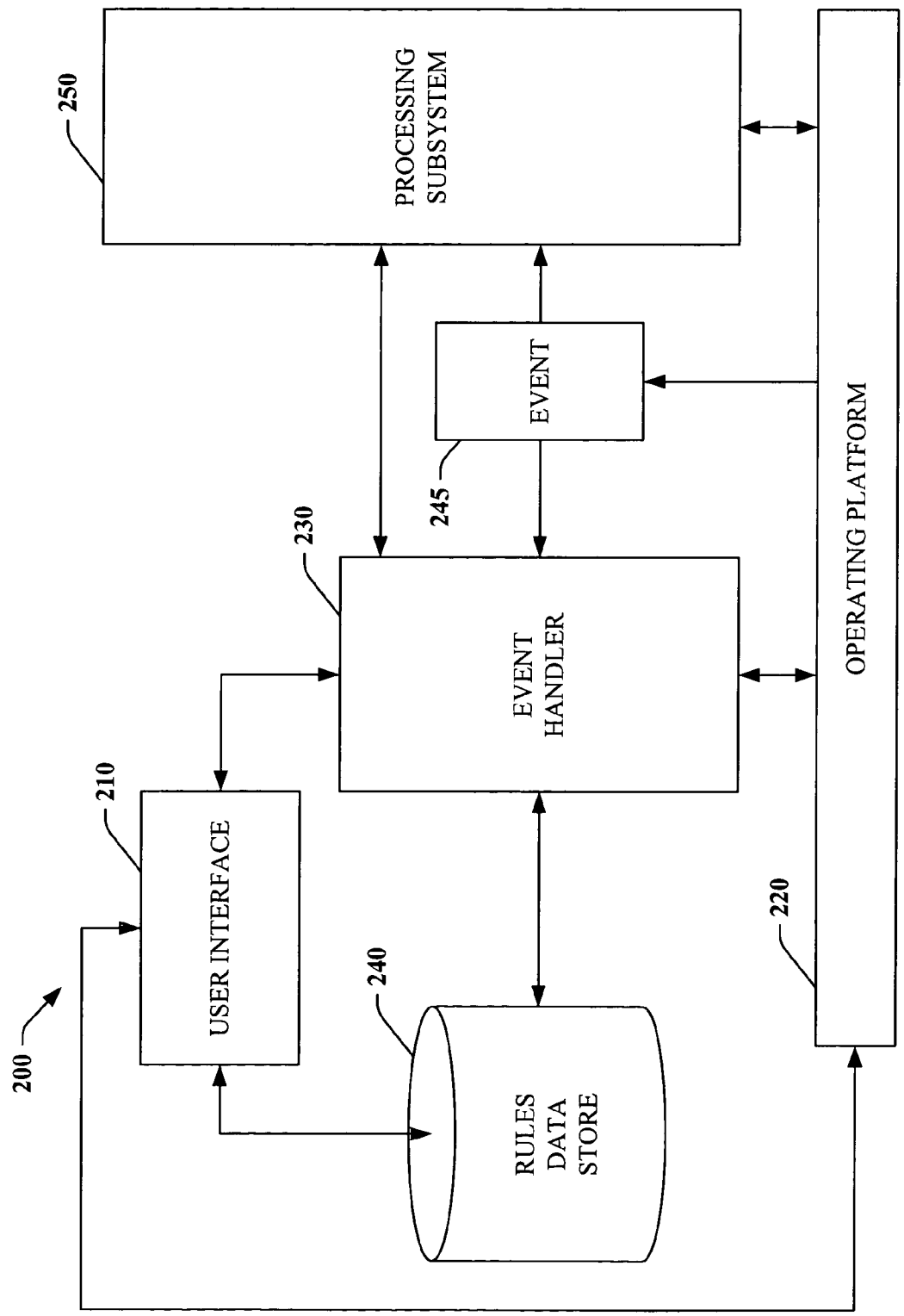
FIG. 2 is a system block diagram of an end-user processing system.

FIG. 2 is a system block diagram of an end user processing system 200. The end user processing system 200 includes a user interface 210 that can provide access to the system for a human user. The user interface 210 can be any appropriate human-computer interface, such as a graphical user interface, a command line interface, or a web-based interface, among others, and can be coupled to an operating platform 220 that can include both hardware and software components. The user interface 210 also can be connected to an event handler 230 and a rules data store 240, wherein the event handler 230 can detect occurrence of an event 245 and access a processing subsystem 250.

In operation, the user interface 210 provides access to the event handler 230 and the rules data store 240 to an end user, who can identify an event to be used as a trigger event and cause binding of that event to a user-defined action. The user-defined action can then in turn be stored within the rules data store 240. The operating platform 220 creates an event 245 that is detected by the event handler 230, which can access the rules data store 240 to determine whether a user-defined action is bound to the detected event. If so, the event handler 230 accesses the processing subsystem 250 to direct the performance of the user-defined action.

Rules to be applied during creation or execution of end-user defined tasks can be in accordance with a rules algebra. Details of an appropriate rules algebra that can be used can vary greatly according to a specific implementation of an EUP module. One exemplary rules algebra is presented and described in more detail below. The exemplary rules algebra can include various logic components that can be integrated to form a rules platform. Among those components are basic terms that can serve as building blocks for other terms and expressions. Terms and expressions that have been built from other terms or expressions can themselves be used as building blocks to create more complex terms or expressions. In this manner, increasingly complex rules can be created to be applied during execution of an end-user defined task.

A Property(T) can describe a property of an end-user type T. An end-user can use a property or properties to describe another logic component, such as a filter or an action. A property can be some general descriptor of an end-user type T. When applied to different types, such as T or T-prime, the same descriptor can be used. In this manner, Property(T) and Property(T-prime) can both be used as descriptors and can be different components. A rule that has an input item type T and output type O can be defined as a property of type O over type T.

A Filter(T) can be a Boolean function that can be used as a filter over items of type T. Specifically, a Filter(T) can be a rule that returns a Boolean type as a processing result of the execution of the rule. A Filter(T) rule that is applied to a set of items can filter items that do not meet a condition of the rule by examining a value for the Boolean type returned following execution of the Filter(T) over an individual item in the set. An item that meets a condition of the Filter(T) rule can prompt the applied Filter(T) rule to return a value of TRUE for the Boolean type returned.

In a similar manner, an item that does not meet a condition of the applied Filter(T) rule can prompt the Filter(T) rule to return a value of FALSE for the Boolean type returned. The Filter(T) rule can be iteratively applied to each item in a set to obtain subsets of items that either meet or fail to meet the condition of the applied Filter(T) rule. In this manner, inclusive or exclusive subsets can be created. An inclusive subset can have items that meet a condition of the applied Filter(T) rule and which prompt a returned Boolean value of TRUE, resulting in those items being described as included. An exclusive subset can have items that fail to meet a condition of the applied Filter(T) rule and which prompt a returned Boolean value of FALSE, resulting in those items being described as excluded. Either subset can be used in further processing.

An Action(T) can be created as a method of an item of type T, wherein the method can have some desired side effect that creates a result. Typically, an Action(T) can use or require other parameters. A rule having an input type T and outputting a closed set can define an action over items of type T. A Set(T) is a grouping of items of type T.

An Event(T) can be used to define some occurrence of interest, and is typically associated with an item of data, for instance, the event data of type T. An Event(T) can be used to define a simple event or can be used as a building block to create a more complex event by using a binary algebraic operation. When combined with a Filter(T), an Event(T) can be used to create a derived Event(T). In algebraic terms, $$\text{DerivedEvent}(T)=\text{Event}(T)+\text{Filter}(T).$$

Generally, a derived event can be created by applying a filter to an event. Other constructs can also be formed using algebraic principles. For example, two filters over complementary item types (e.g. two types that are both subtypes of the same parent type) can be combined as follows:

$$\text{Filter}(T)=\text{Filter1}(T\_subtype\_1)\text{Union Filter2}(T\_subtype\_2).$$

A batch can define a set-oriented task to be performed by a program module. Semantics of a batch can be defined to result in execution of some predefined action upon each item in a set. As with other modules, a batch can be executed upon a manual command or upon automatic occurrence of some event. A batch can be created by combining a set with an action as follows:

$$\text{Batch}=\text{Set}(T)+\text{Action}(T).$$

An agent can define some action to be performed upon occurrence of a predefined event, where the predefined event can serve as a trigger that can activate execution of the agent and performance of the action associated with the agent. In algebraic terms, $$\text{Agent}=\text{Event}(T)+\text{Action}(T).$$

Rules can be created using a variety of conditions that can be connected in some logical fashion. Within each rule, conditions can be composed a variety of ways. For example, items having a specified property can be described using:

---

<property> <comparison operator> <expression>
<existing filter>
ANY/EVERY <relationship target> MATCHES <filter>
ANY/EVERY <relationship target> IN <set>.

---

Other conditions are also possible and can be used to compose rules.

Individual EUP logic components can be evaluated within an application. Such evaluations can be performed as background tasks and therefore be invisible to a user. Additionally or alternatively, these tasks can be explicitly executed subject to a command input by a user. Generally, several types of programs can be used as a core group of programs. For example, a core type such as a derived set can be a complete end-user program. When a derived set is activated or executed, commands associated with the logic of the set definition can be executed and results of that execution displayed. Additionally, derived sets can be used in algebraic operations. For example, two derived sets can be combined as follows:

Set(T)=Set1(T)Union Set2(T).

As another example, agents can be created to perform specified actions upon the occurrence of predefined events. As previously defined, an Agent is an Event(T) combined with an Action(T). Upon occurrence of the event portion of the agent, the processing steps of the action portion of the agent can be performed. In this manner, execution of an agent can be triggered without any intervention from an end user.

An EUP algebra can be accessed through an application programming interface (API), which can provide a means to access object types and operations prescribed by the rules algebra. Additionally, the API can provide a group of predefined components such as previously constructed EUP logic components that can be accessed directly as an alternative to constructing such components from basic terms.

Figure 3:
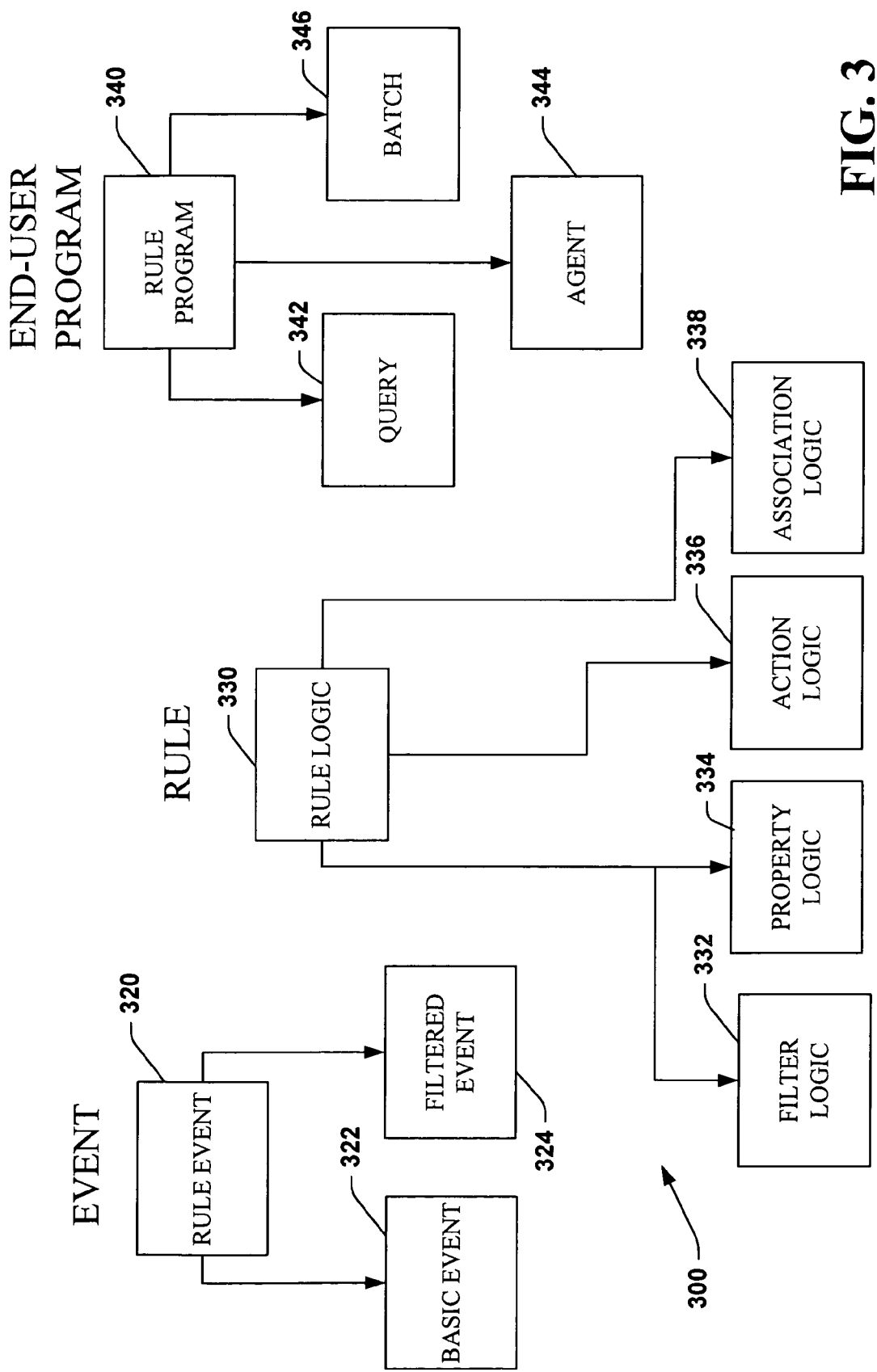
FIG. 3 is a schema diagram of a rules schema.

FIG. 3 is a schema diagram of a rule type hierarchy 300. The schema of the rule type hierarchy 300 can be used to organize types into one or more functioning components such as an event, a rule, or an end-user program as described herein. Additionally or alternatively, some other component or a variant of one or more of these described components can be created according to details of a specific implementation A created event, rule, or end-user program can be used alone or in combination, as appropriate, to perform some data processing task, depending upon particulars of components as assembled or defined by an end user. In the example presented in this FIG. 3, an event can be a rule event such as rule event 320 that can trigger execution of an executable component. A rule can be rule logic such as rule logic 330 that can define logic to be applied to a computing scenario. A rule program, such as rule program 340, can be an end-user program or another executable component. In this specific example, each of the rule event 320, the rule logic 330, and the rule program 340 can be associated with one or more subcomponents. Accordingly, each of these subcomponents can, for example, be a simple item type such as an event, or can instead be an end user-created or complex type such as a derived set.

The rule event component 320 can be a base type for all the event types used by rules platform agents created by end users, and can be conceptually abstract and serve to provide a common type that can be referenced by each agent. An agent can refer to an instance of a rule event component, such as the rule event component 320, that can notify the agent when to execute or trigger such execution. The rule event component 320 can, for instance, be or be associated with a basic event such as basic event 322 or a derived event such as the filtered event 324. In one example, the basic event 322 can be derived from the rule event component 320. A basic event type, such as the basic event 322, can act as a hook point for an application to submit an input item to a rules system to represent the firing of a logical event. For example, a basic event can represent such events as an item being added to a data store or an item of a data store being modified, among others. Submitting an input item through an event item can communicate the fact that the event has occurred and begin a process that can result in firing another event.

The filtered event 324 can also be derived from the rule event component 320. The filtered event 324 can include a reference to another rule event and a reference to an instance of a filter logic type to use to filter firings of the event. The filtered event 324 can fire based upon firing of its source rule event component, such as the rule event component 320. Upon firing of the source event, the filtered event 324 can take an input item upon which the source event was fired and evaluate an instance of its filter logic component over the input item. The filtered event 324 will fire if and only if the filter logic evaluates to TRUE. In this example, a filtered event such as the filtered event 324 cannot be raised directly using an API function call but rather only can be raised when its source event is fired and its filter logic evaluates to TRUE for the input item on which the source event fired.

The rule logic component 330 can be described as a rule in the sense that the rule logic component can have defined processing steps that can cause one or more computing tasks to be performed by a component that uses or is otherwise associated with the rule logic component 330. The rule logic component 330 can be, or be associated with, a filter logic 332, a property logic 334, an action logic 336, and an association logic 338. The filter logic 332, property logic 334, action logic 336, and association logic 338 can be used to create rule logic. The filter logic 332 can define rule logic that filters a given item instance of the input type. The output type for the filter logic 332 can be a Boolean value or a null value. The property logic 334 can also define a rule. The defined rule can calculate a value of a specified type when given a specific item instance and therefore can act as a computed property. To support this concept, an output type of the property logic 334 can be represented as a property type.

The action logic 336 can define a rule that can generate a sequence of actions to perform when given a specific item instance of a specified input type. Output of the action logic 336 can be an object that is enumerable and that encodes the sequence of actions to be performed. The association logic 338 can be derived from a rule definition and can define a rule that can generate a set of items of a specified targeted type when given a specific item instance of a source type. Output of the association logic 338 can be an instance of an enumerable item that constitutes the item set.

One class of terms described by this exemplary rules algebra includes executable components. These executable components do not themselves include logic statements but rather are wrapper programs that can be authored by an end user and serve to tie together rule logic definitions with input collections. One executable component can be the rule program 340. The rule program 340 can form a common base type for end user program types. A primary function of the rule program 340 can be to allow all instances of end user program types, such as batches and agents, to persist, to be able to be retrieved, and to be able to be filtered based upon such a common input type.

The rule program 340 can be or be associated with other components such as a query 342, an agent 344, and a batch 346. The query 342 can represent a computed result set of items that are able to be evaluated in accordance with strictures of a query. The agent 344 can represent an action or actions to be performed upon the firing of an event or occurrence of some happening. The batch 346 can represent an action or actions to be performed over a collection of items. An end user can combine these components in a wide variety of ways to create an executable rule program.

Figure 4:
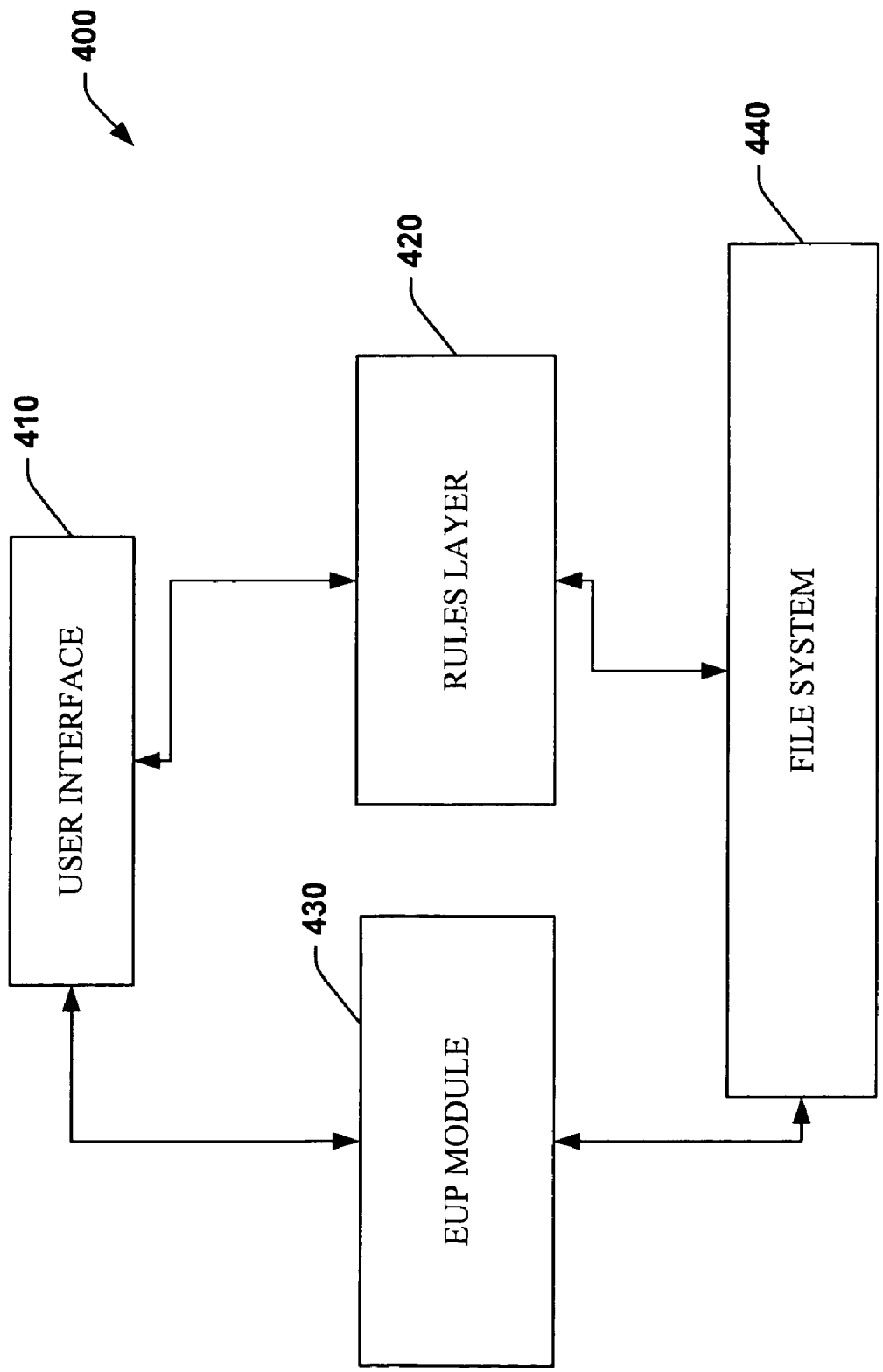
FIG. 4 is a system block diagram of an end user programming system with an integrated file system.

FIG. 4 is a system block diagram of an end user programming system 400 that includes an integrated file system. The end user programming system 400 can derive support for its programming functions from specific features of this underlying file system. Specifically, integration of an EUP system with an appropriate underlying file system can provide a basis upon which every aspect of a computing system with which an end user interacts can be made programmable.

The end user programming system 400 includes a user interface 410, which can be any appropriate user interface such as a graphical user interface, a web-based interface, a text-based interface, or a command line interface, among others. The user interface 410 is coupled to a rules layer 420 and an end user programming module 430. The rules layer 420 can include all predefined components of an EUP system, including end user-created agents, batches, and other components.

The end user programming module 430 provides a mechanism by which an end user can define components such as agents. The end user programming module 430, along with the user interface 420, can provide many, if not all, of the functionality that an integrated development environment can provide to a traditional software developer. Such functions can include the ability to reuse components, version components, build components by dragging and dropping graphical widgets, or by scripting actions, among other approaches.

The file system layer 440 can provide a conceptual representation of how data items are stored on some physical medium such as a hard disk or an optical disk, among others. In this specific example, a file system that draws heavily upon object-oriented design concepts is presented. More specifically, the file system layer 440 can provide a framework within which items can be stored as part of an overall expression, wherein the expression can be accessed through an API and evaluated to produce some desired result. The file system layer 440 can also include a set of inline types that can be used for persistence only and that are not used as parameters or results of methods.

The file system layer 440 can include a group of logical operators such as "not," "and," and "or." Additionally, the file system layer 440 can provide robust programming constructs such as conditional operators, arithmetic operators, aggregation operators, date, time, and string operators, and type casting, among others. Also, methods and abilities to invoke such methods are also provided. For example, various constructors, destructors, value accessors and value setters can be accessed through an API.

Among the support functions that the file system layer 440 can provide are infrastructure functions for managing, naming, sharing, storing, synchronizing, and searching for data. The file system layer 440 can provide all these capabilities to the rules layer 420 and the end user programming module 430 so that an end user can access all the capabilities the file system 440 can offer as part of constructing an end user program. In the examples presented herein, the schema of the rules must conform to a type system supported by the file system. Also, the entire API surface for end user programming concepts follows standard models of file system APIs. One side effect of these design choices is that generic user interface applications that work against file system items will work against end user programming items as well.

Logically, there can be two schema levels in the file system layer 440. At the first level there can be a schema for developer code. This developer code schema can define types of items and behavioral aspects of those items. By using this level of schema, developers share data abstractions with a common frame of reference. At the second level there can be a schema for end user logic. This end user logic level can be used to provide a framework for end user rules.

Type systems for both end users and the file system 440 also can be closely aligned. Specifically, in this example, a type hierarchy of end user types can be a simplification of a type hierarchy of file system types. Some types in the file system hierarchy can potentially be omitted because they are irrelevant to end users. Additionally, a mapping or binding can be created from every end user type to an underlying file system type. Mappings or bindings can be used to bridge a gap between the end user level and the file system level. Bindings can serve multiple purposes, including the ability to localize names of end user schema elements. Specifically, in this example, a binding can be a rule. In a trivial exemplary case, the binding can be a rule with a single statement whose condition is always true and whose result is a specific underlying property on the developer type.

Bindings can also provide a level of indirection between the developer level schema and the end user level schema. Various access control policies can be applied here depending upon a specific implementation. For example, file system developers can be allowed to define which properties of types the developers create will be accessible to end users. Alternatively, end users can be given the ability to decide which properties of developer-created types the end user desires to access. Some combination of these two approaches is also possible.

Figure 5:
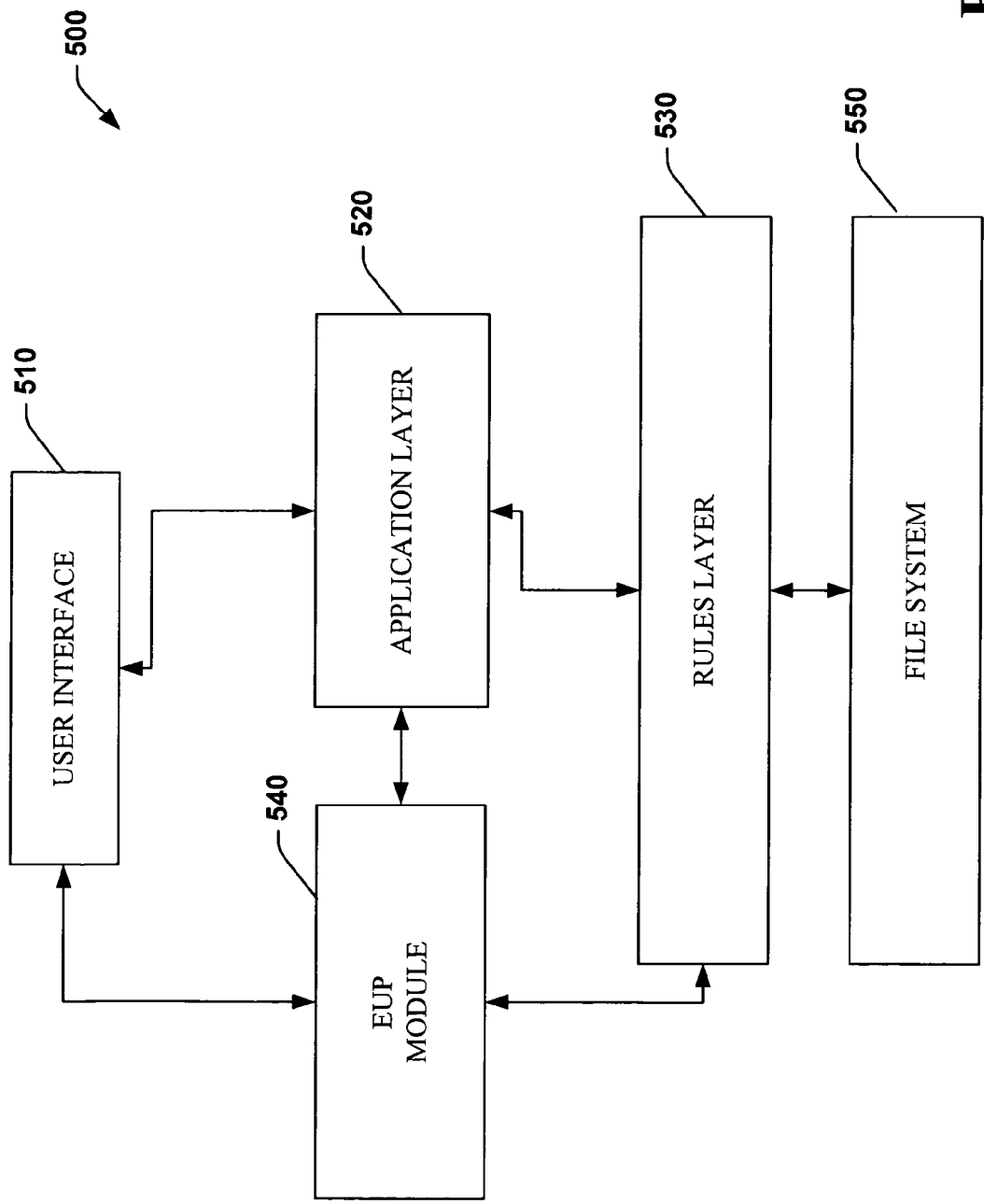
FIG. 5 is a system block diagram of an end user programming system with an integrated file system.

FIG. 5 is a system block diagram of an end user programming system 500 that includes an integrated file system. The end user programming system 500 can be used to customize applications that can run in a space controlled or owned by an end user. Additionally or alternatively, the end user programming system 500 can be used to create components that modify behavior of applications that operate in other spaces such as system processes or daemons, among others.

The end user programming system 500 includes a user interface 510, which can be any appropriate user interface such as a graphical user interface, a web-based interface, a text-based interface, or a command line interface, among others. Also possible are specialized interfaces such as Braille interfaces for the blind and audio interfaces, among others. The user interface 510 is coupled to an application layer 520, which can include such end-user controlled applications such as email clients, word processors, spreadsheet programs, and web browsers, among others. Additionally or alternatively, the application layer 520 can include so-called system processes that provide services to other executing computer programs such as domain name system (DNS) lookups and networking capabilities, among others.

A rules layer 530 is coupled to the application layer 520. The rules layer 530 provides end user programming components and support to the application layer 520 and can be implemented in a similar fashion as the rules layer 420 of FIG. 4. Also, an end user programming module 540 is coupled to both the rules layer 530 and the user interface 540. The end user programming module 540 can provide access to the rules layer 530 and the ability to create new rules, much as the end user programming module 430 of FIG. 4.

A file system 550 can provide a storage framework upon which rules of the rules layer 530 and other end user programs that can be created by the end user programming module 540 can be accessed or otherwise used by the application layer 520. Any suitable file system can be used or adapted for use in this context. A file system that has an API that can be integrated with or mapped to an API for end user programming functions is especially suited for this use.

In operation, an end user can interact with the end user programming system 500 through the user interface 510. The end user can use the end user programming module 540 to create rules, agents, or batches, among other things, that can be added to the rules layer 530. The end user can also access applications of the application layer 520 through the user interface 510.

When an event or some other triggering object causes a rule to activate, messages can be passed between the application layer 520 and the rules layer 530. Depending upon specifics of rule activation, these messages can be synchronous or asynchronous. Whichever rule or rules were activated can then execute in accordance with their design and make whatever modifications are appropriate at the file system level 550 by using mapped or bound portions of the file system API.

Figure 6:
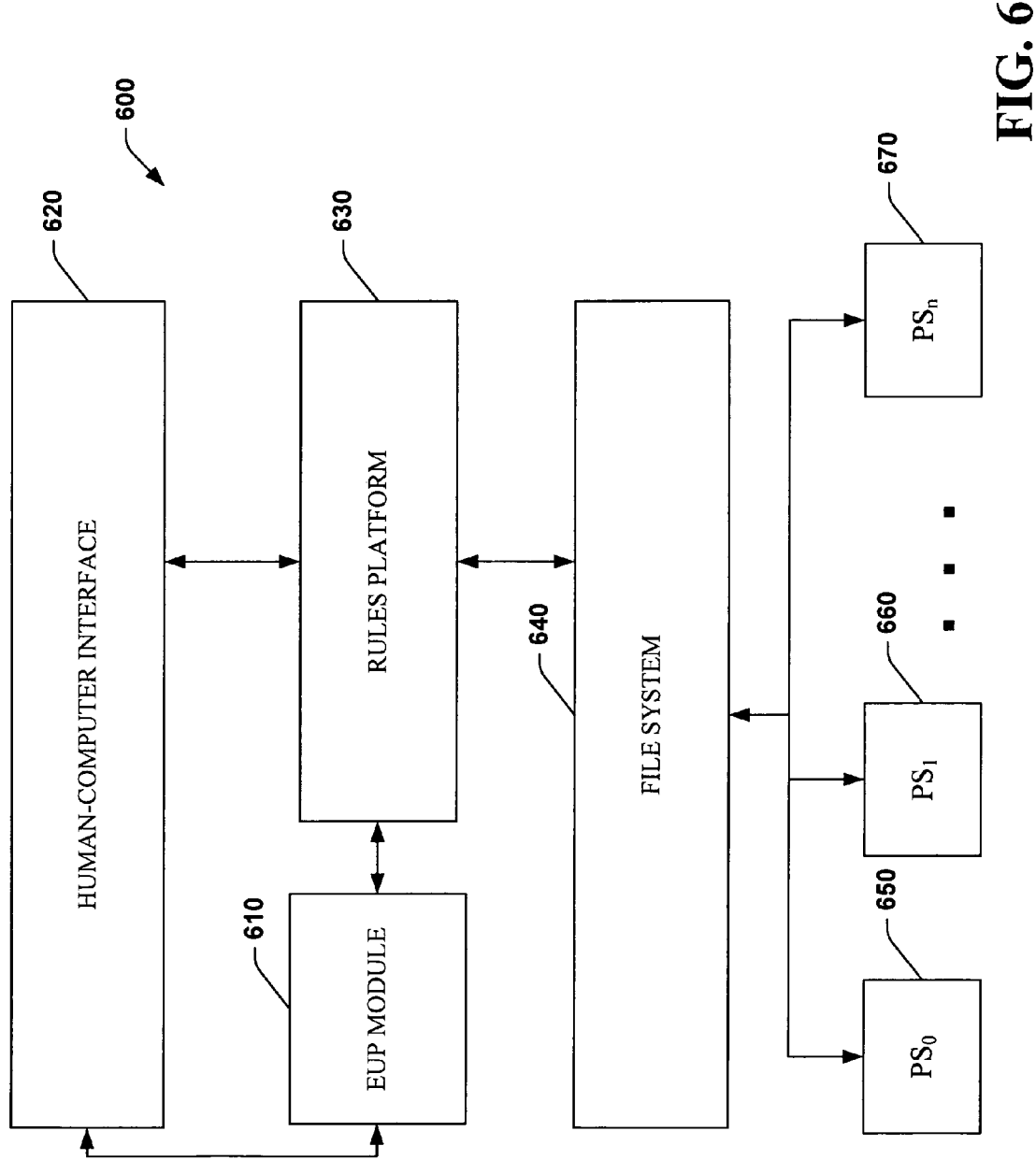
FIG. 6 is a system block diagram of an end user programming system with an integrated file system.

FIG. 6 is a system block diagram of an end user programming system 600 that can be used to create end user defined program modules that manage electronic information stored on a file system. These program modules can automatically apply rules created by an end user to manipulate information stored on a file system in accordance with specific instructions from an end user. Such instructions can include applying filters to group information or to perform specific information management tasks, such as organization tasks, upon occurrence of some predefined event.

The end user programming system 600 includes an end-user programming module 610 that can provide access to end user programming support functions such as rule creation or modification and event definition. The end-user programming module 610 specifically can be implemented as any of the end-user programming modules previously described in conjunction with other figures. End user programs created using the end-user programming module 610 can execute automatically, as with an event-driven program, or can be invoked by a specific command from the end user.

A human-computer interface 620 can provide access to functions and features of the end-user programming module 610. A variety of components can be used to implement the human computer interface 620 depending upon specific implementation needs and desires. For example, the human computer interface 620 can be implemented as a graphical user interface, such as a graphical user interface of an operating system. Alternatively, the human computer interface 620 can be based upon a web browser, can be a text-based interface such as a command line, can be a Braille touch-based interface, or can be a speech-based interface, among others.

A rules platform 630 can include the end user defined programs created using the end-user programming module 610. Additionally, building block components that can be used to create end user programs can be included in the rules platform 630. The end-user programming module 610 and the human computer interface 620 can both access the rules platform 630 to allow an end user to create, modify, delete, and invoke execution of end user programs in the rules platform 630.

The rules platform 630 is coupled to the file system 640. The file system 640 can be implemented as any appropriate file system that can support data organization and retrieval tasks. Specifically, the file system 640, along with an API that provides access to functions of the file system 640, can be mated with an API of the rules platform 630 so that functions of the rules platform 630 can be mapped or bound to functions of the file system 640. Integration of the rules platform 630 with the file system 640 in this manner effectively exposes functions of the file system 640 to an end user so that the end user can use file system functions for various computing tasks including information organization and automated processing tasks, among others. Access to functions of the file system 640 by the end user is through the rules platform 630, providing a layer of protection for the file system 640 from inadvertent or malicious actions that can corrupt or otherwise damage the file system. For example, a specific function such as moving a file from one physical location on a storage device to another location without changing a logical location of the file can remain unmapped or unbound to a function of the end-user programming module 610 or the rules platform 630, preventing the end user from accessing that function.

The file system 640 can impose a logical file organization scheme on one or more persistent storage devices 650, 660, 670 (PS). The persistent storage devices 650, 660, 670 can be hard disk drives, optical drives, flash memory devices, or other appropriate storage devices, and can operate independently as separate disks that each use a file system. Additionally or alternatively, the persistent storage devices 650, 660, 670 can be logical partitions on one or more physical disk drives. In this configuration, an end user can be aware of the fact that there are multiple disks or partitions providing storage space. The persistent storage devices 650, 660, 670 can also be integrated as part of a single logical storage volume, as with a redundant array of independent disks (RAID). When configured as a RAID array, the persistent storage devices 650, 660, 670 can be accessed as a single entity using a single file system. Also, the persistent storage devices 650, 660, 670 can be part of a storage area network (SAN) or some other storage system.

In operation, the end user programming system 600 can function as follows. An end user can access the end-user programming module 610 through the human-computer interface 620 to create an end user program. The end user program resides on the rules platform 630 until execution is invoked by a command from the end user or upon occurrence of a specific or predefined event. The rules platform 630 sends a message to the file system 640 that requests that the file system 640 perform some information manipulation task on the persistent storage devices 650, 660, 670. Upon successful completion or failure of the requested task and in a synchronous messaging environment, the file system 640 sends a message to the rules platform 630 to inform the end user program of the result of the requested task. Alternatively, as with an asynchronous messaging system, the file system 640 can perform or attempt to perform the requested task without sending a reply message to the rules platform 630. Information about the requested action is displayed on the human-computer interface 620 for viewing by the end user.

Figure 7:
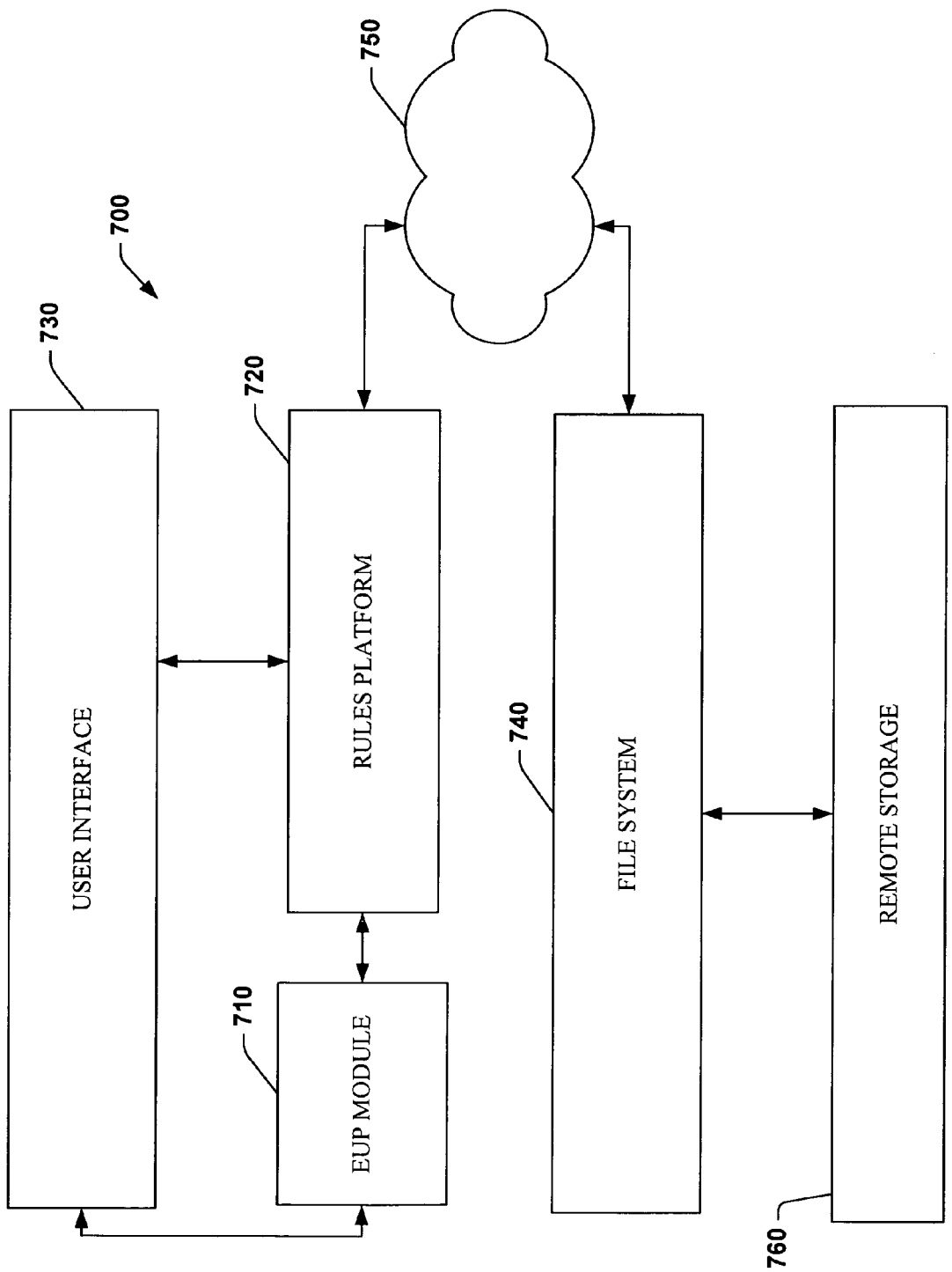
FIG. 7 is a system block diagram of an end user programming system with an integrated file system.

FIG. 7 is a system block diagram of a networked end user programming system 700 that can be used to create end user defined program modules that manage electronic information stored on a remote file system, wherein the information can be accessed over a network. Networked end user program modules can automatically apply rules created by an end user to access or manipulate information stored on the remote file system. The networked end user programming system 700 includes an end-user programming module 710 that can provide access to end user programming support functions like rule creation, rule modification and definition or identification of triggering events. The end-user programming module 710 specifically can be implemented as any of the end-user programming modules previously described in conjunction with other figures. Consistent with such an implementation, end user programs created using the end-user programming module 710 can execute automatically, as with an event-driven program, or can be invoked by a specific command from the end user.

A rules platform 720 can include the end user defined programs created using the end-user programming module 710. Additionally, building block components that can be used to create end user programs can be included in the rules platform 720. The end user programming module 710 and a user interface 730 can both access the rules platform 720 to allow an end user to create, modify, delete, and invoke execution of end user programs in the rules platform 720. The rules platform 720 can also provide networking or other communication functions, such as message passing, between end user programs or other components of the rules platform 720 and a file system 740. To do so, the rules platform can use a network 750. The network 750 can be any appropriate wired or wireless network, can be a local area network (LAN), a wide area network (WAN), an intranet, or the Internet, among others. Consistent with this implementation, the rules platform 720 can include networking components such as communications stacks like a transfer control protocol/Internet protocol (TCP/IP) stack, among others. Alternatively, the rules platform 720 can merely have access to such functions provided by another component such as an operating system or a networking application.

The file system 740 can impose an organizational hierarchy upon a remote storage device 760. The remote storage device can be a persistent storage device such as a disk drive or any other type of persistent storage device, specifically including types disclosed and described in conjunction with other figures. Additionally or alternatively, the remote storage device can be a database or another type of data store that can provide access and manipulation features in a manner similar to that of a file system.

In operation, the networked end user programming system 700 can function as follows. An end user can access the end-user programming module 710 through the user interface 730 to create one or more end user programs. These end user programs reside on the rules platform 720 until execution is invoked by a command from the end user or upon occurrence of a specific or predefined event. The rules platform 720 uses the network 750 to pass a message to the file system 740 requesting the file system 740 to perform some information-related task in connection with the remote storage device 760. Upon successful completion or failure of the requested task, the file system 740 uses the network 750 to pass a message to the rules platform 720 to inform the end user program of the result of the requested task. Information about the result is displayed on the user interface 730 for viewing by the end user.

Figure 8:
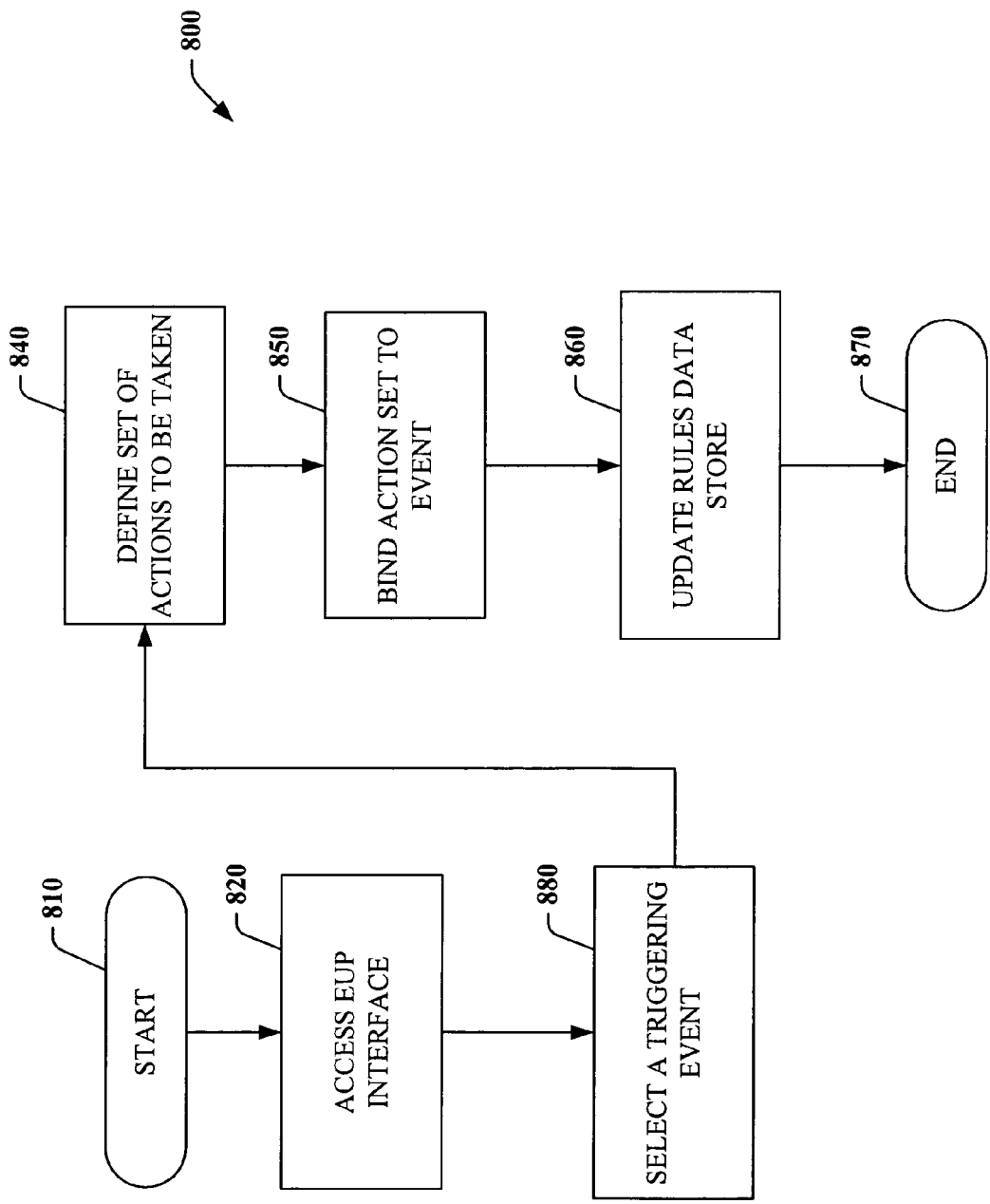
FIG. 8 is a flow diagram of a general processing method that can be used in conjunction with components that are disclosed and described herein.
Figure 9:
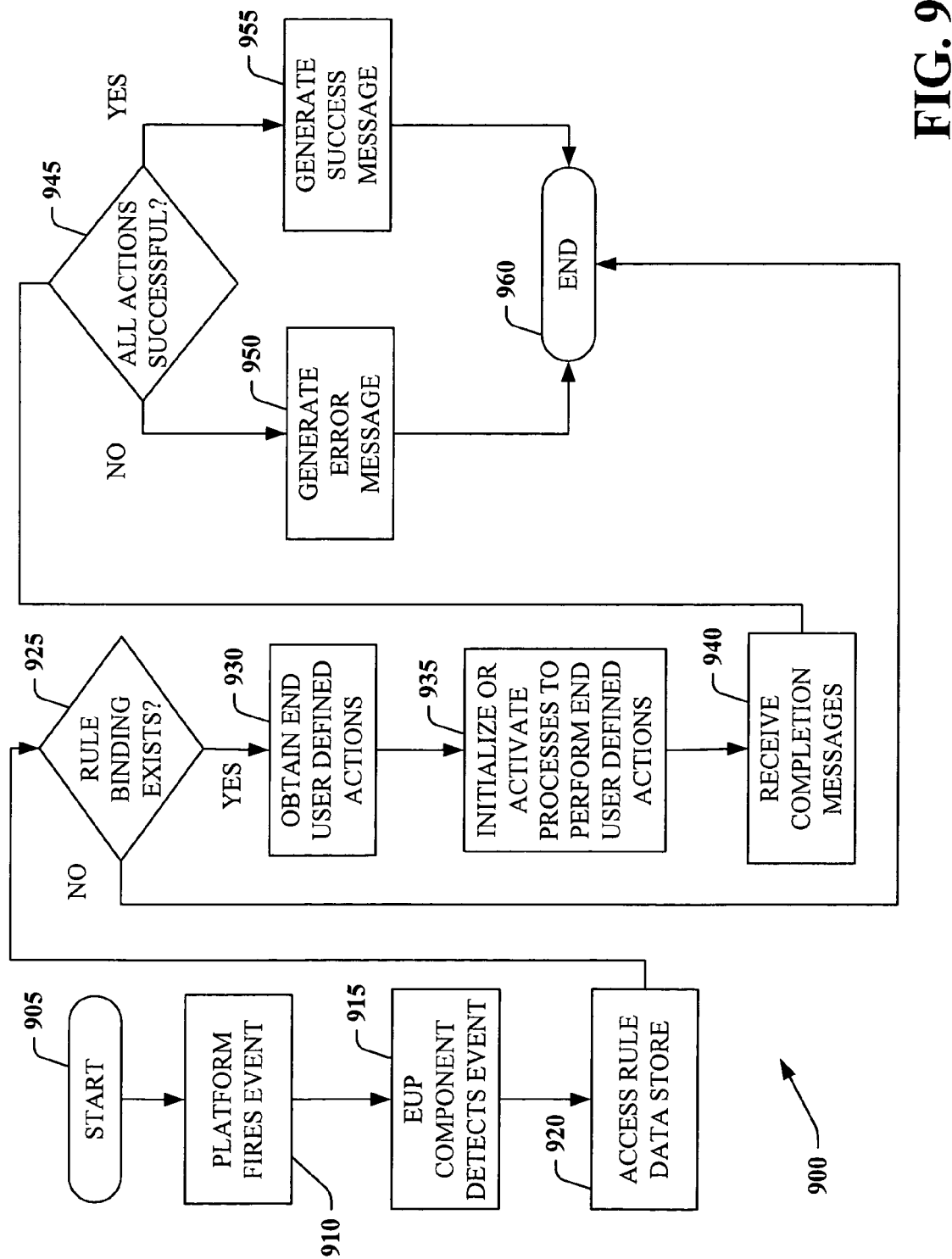
FIG. 9 is a flow diagram of a general processing method that can be used in conjunction with components that are disclosed and described herein.

With reference to FIGS. 8-9, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

FIG. 8 is a flow diagram of a process 800 that can be used in conjunction with components that have been disclosed or described herein with reference to other figures. Execution of the process 800 begins at START block 810 and continues to process block 820 where the EUP interface is accessed by an end user. The end user then selects a trigger event at process block 830. For instance, the trigger event can be an arrival of an email message, creation of a document, or some other event. At process block 840, a set of actions, which can include a plurality of actions, a single action or no action, is defined. These actions can be such things as moving a file to a specified location, automatically replying to an email message, or converting a file from one format to another, among others. The set of actions is bound to the event at process block 850. The rule base is updated with the new binding at process block 860. Processing concludes at END block 870.

FIG. 9 is a flow diagram of a process 900 that can be used in conjunction with components that have been disclosed or described herein with reference to other figures. Processing begins at START block 905 and continues to process block 910 where the computing platform fires an event. At process block 915 the EUP component detects the event. Processing continues at process block 920 where the EUP accesses the rule data store. At decision block 925 a determination is made whether a rule binding exists for the detected event. If yes, processing continues at process block 930 where the end user defined actions are obtained. At process block 935, processes are initialized or activated to perform the end user defined actions. Completion messages are received from those processes at process block 940.

A determination is made whether all processes successfully completed at decision block 945. If yes, a general success indicator is created at 955. If no, a general error message is created at process block 950. Processing concludes from both process block 950 and process block 955 at END block 960. Similarly, if the determination made at decision block 925 is no, processing concludes at END block 960.

Figure 10:
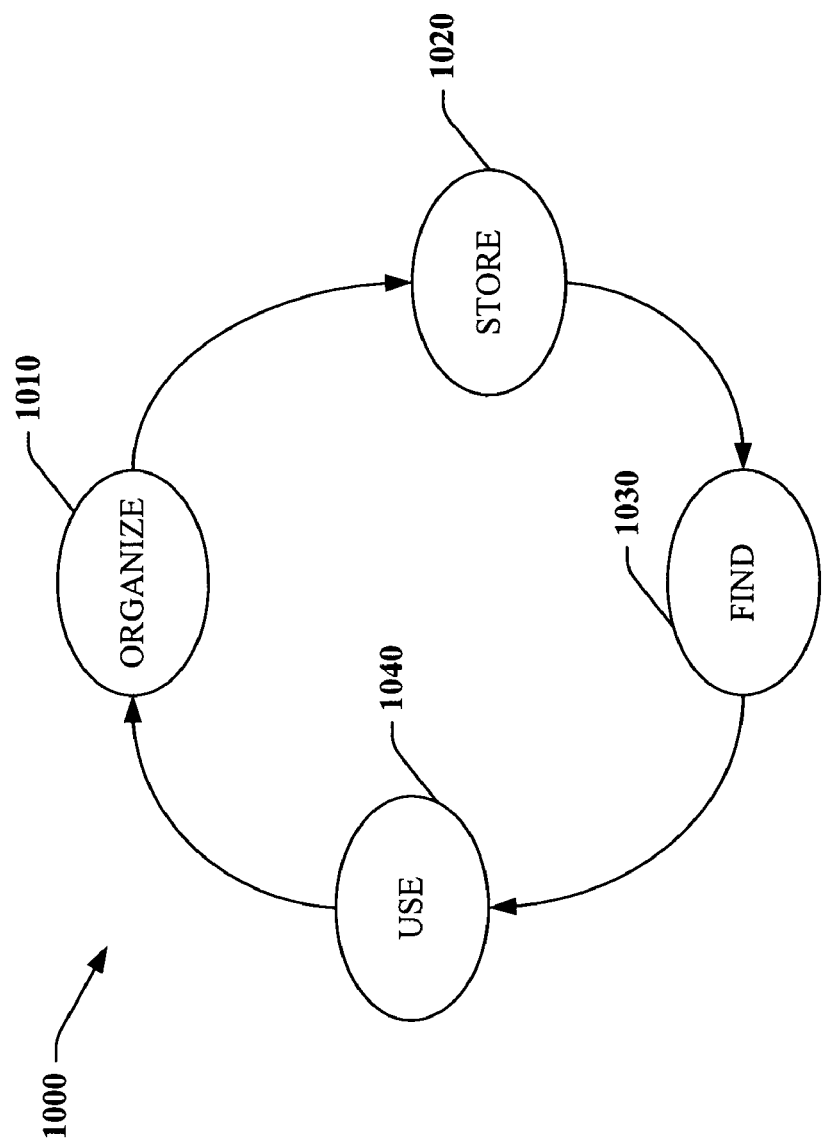
FIG. 10 is a flow diagram of an information life cycle.

FIG. 10 is a flow diagram of an information life cycle 1000. The information life cycle can generally describe existence of an item of data on a computing system. Such existence can begin when a user first creates or obtains a specific item of data and end when the user deletes the item or otherwise discards the data. The information life cycle 1000 includes an organization phase 1010, which represents a point when the end user has created or obtained an item of information and desires to have that item of information persisted and remain available to him. There are at least two techniques that can be used to organize data. With reference to the first technique, properties of an item can be assigned values. For example, an item can be given a name or some other description that can be stored as metadata or an attribute, among other things. With reference to the second technique, relationships of an item can be assigned. Assignment of relationships can assist in location of items by manual navigation or by searching. In particular, certain relationships can be associated with special organization semantics in applications. For example, a folder containment relationship can be a common hierarchical manner with which to organize information according to a common topic.

Properties and relationships can be assigned values in at least two different ways. Actual values can be materialized and maintained with the item data. Additionally or alternatively, values can be computed from other data upon demand. In this case, a definition of the computation to be performed to obtain the data can be stored as metadata. Computed mechanisms for data organization are appropriate when rules for data organization are well-defined, easily expressible, and based entirely on available information. Computed mechanisms also scale well to deal with large volumes of data. Materialized mechanisms are appropriate when data organization logic cannot easily be expressed or is based upon information that cannot be easily captured such as content or context information. End user programs can define computed properties and relationships. Such programs can also be used to automatically maintain materialized properties and relationships.

A store phase 1020 can indicate that a user is saving an item of information in a persistent format that can be accessed later. Persistent formats that can be used include files and objects, among others. Details of such persistent formats can vary according to particular details of a file system within which the persistent format is stored. For example, both a hard disk drive and an optical disk can be used as persistent storage devices. However, file system formats for the hard disk drive vary greatly from file system formats such as ISO 9660 that can be used on optical disks.

A find phase 1030 can indicate a period when an end user desires to retrieve information stored in some persistent format. The term find can include any activity that can cause an item to be identified as available for the end user to act upon. There are at least three ways in which an end user can find data. In the first, the end user can browse or navigate to the data. In this manner, the end user begins at some starting point, such as a home or reference directory. Relationships between or among data items can provide pathways to browse or traverse items in a data store. One specific example is navigating through a hierarchical directory tree.

In the second approach, the end user can execute a query. A query defined by an end user can describe a subset of items in a data store that can match some declarative description. Using the third approach, an event can be used by the end user to find an item. An event of this type can be used to draw attention to some specific item. For example, addition of a file to a directory can be an event that draws attention to the added file.

Each of these approaches has strengths and weaknesses. Query-based mechanisms can be used when logic used to find items is well-defined and easily expressed in terms of concepts modeled in the data store. Execution of queries can be scalable and efficient—however, query execution can also be computationally intensive, even when a relatively efficient query mechanism is used. Navigational mechanisms can be used to provide flexibility but require more user involvement than queries. Additionally, navigational mechanisms do not necessarily scale as well as query mechanisms to deal with large sets of data.

Event-driven mechanisms are suited for instances when a goal is to find appropriate data at an appropriate point in time without direct user involvement. There are at least two basic kinds of events. First, an application event can be caused by execution of a specific application or set of applications. Second, a data change event can be caused by any activity that changes data, independent of the application that caused the change in data. A data change event can be raised by a data management system. Particular types of events can be raised either synchronously or asynchronously. For synchronous events, an application or system expects a response to the event before continuing. For asynchronous events, no such response is needed before the raising application can continue processing its tasks.

A use phase 1040 can indicate that the end user has found and retrieved the data and is ready to use it or otherwise act upon the data. Basic actions on items can be provided by applications that expose the items to an end user. Some actions can be intrinsic to an item type. For example, an action can be used to set a property of an item. Other actions can be intrinsic to the application that can use the item. An example here is an action to display text of a message item in a specific color.

Computed actions can be constructed from other actions using at least one of the following mechanisms. First, actions on relationships can be used. In this scheme, an action on an item can be defined to include actions on targets or the relationships of the items. For example, when a relationship is used to define a set of items such as a folder group, computed actions can specify uniform actions on all members of the set. This process can be referred to as a batch. Conditional actions can also be used. Existing actions can be combined with conditional logic to define a conditional computed action. For example, if a document is marked as confidential, a priority flag can be set to indicate high priority. If the document is not marked as confidential, a priority flag can be set to indicate that the document has a normal priority. Further, an action sequence can be created such that multiple actions are placed on a list that must be executed sequentially. For example, an action sequence can be used to print a document and then delete the document. Actions such as these can have side effects that may create situations where order of actions must be deterministic in order for the defined behavior to be sensible.

Figure 11:
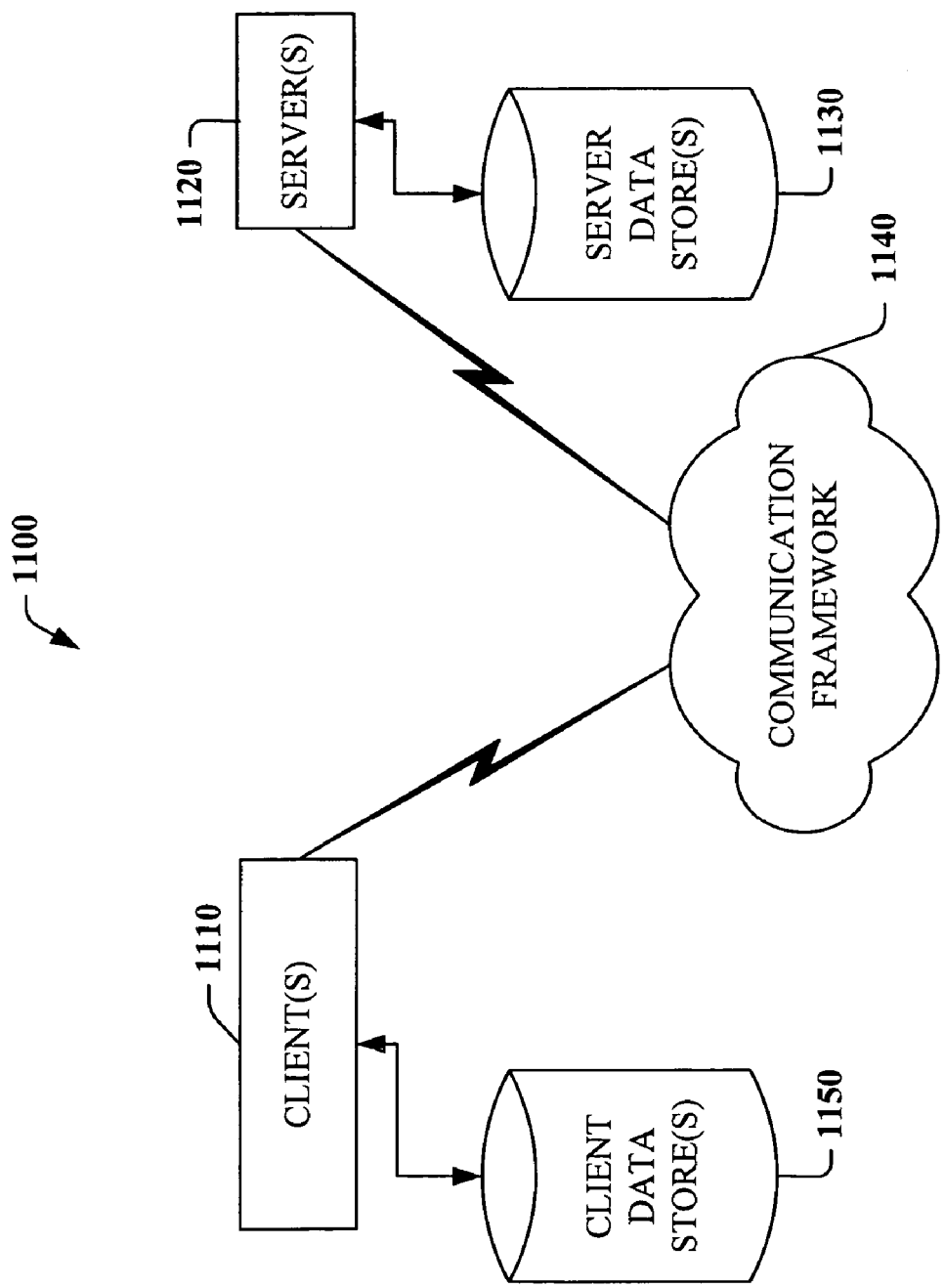
FIG. 11 is a system block diagram of an exemplary networking environment.
Figure 12:
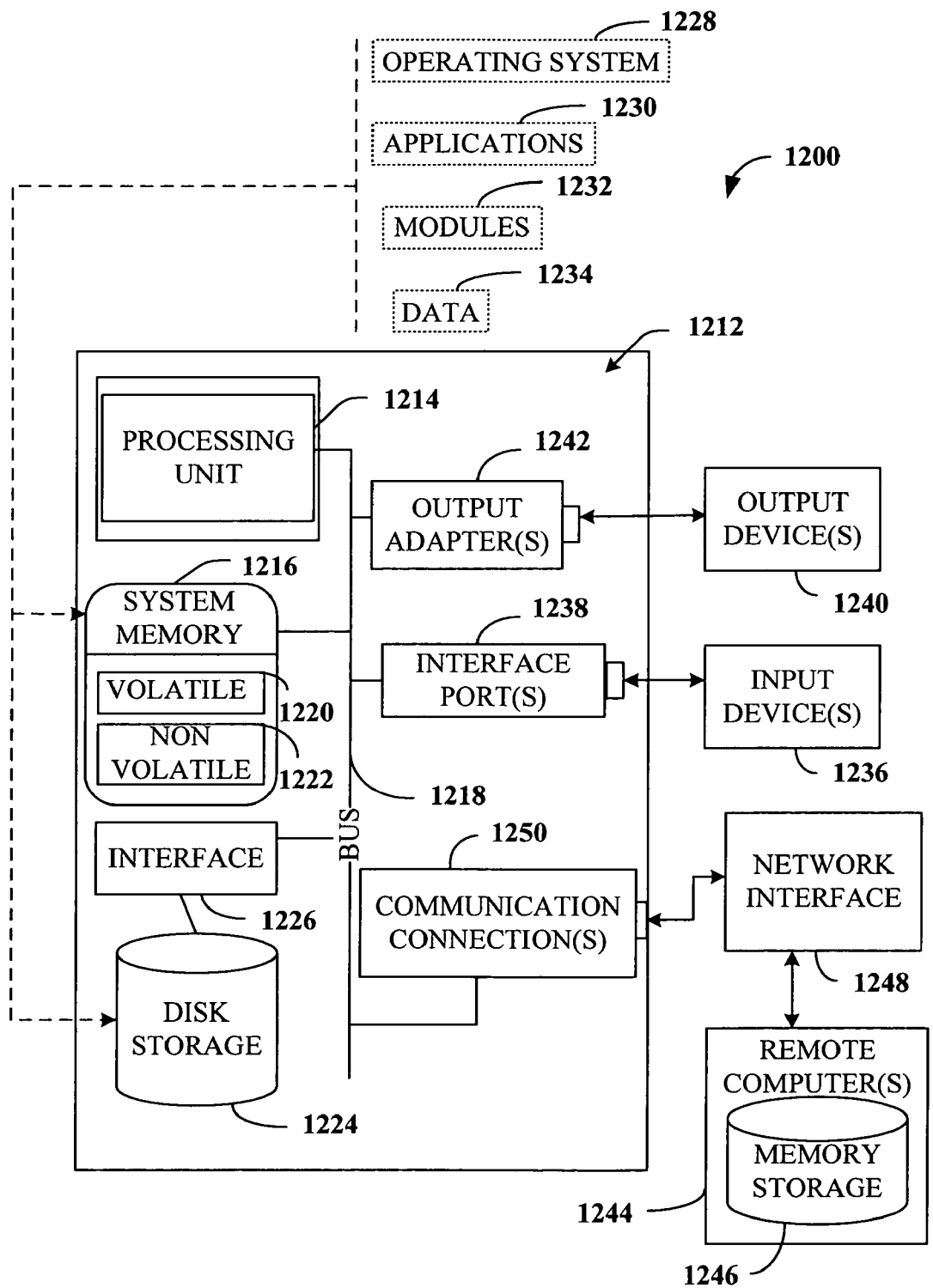
FIG. 12 is a system block diagram of an exemplary operating environment.

In order to provide additional context for implementing various aspects of the subject invention, FIGS. 11-12 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

Furthermore, the disclosed and described components or processes may be implemented as a method, apparatus, or article of manufacture using standard programming and/or engineering techniques to produce software, firmware, hardware, or any combination thereof to control a computer to implement the disclosed and described components or processes. The term "article of manufacture" as used herein is intended to encompass a computer program accessible from any computer-readable device, carrier, or media. For example, computer readable media can include but are not limited to magnetic storage devices, for example, hard disk, floppy disk, and magnetic strips, among others, optical disks such as compact disks (CDs) and digital versatile disks (DVDs), among others, smart cards, and flash memory devices like, card, stick, and key drives, among others. Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many minor modifications may be made to this configuration.

It should also be appreciated that although specific examples presented may describe or depict systems or method that are based upon searches of contents of file systems on a personal computer, application is not limited to that domain. For example, the disclosed and described components and methods may also be employed on an intranet, a private network, or the Internet. Additionally or alternatively, the disclosed and described components and methods can be used as part of a storage area network (SAN). Those of ordinary skill in the art will readily recognize that the disclosed and described components and methods can be used to search for and manipulate other types of information, including web pages, database queries, photograph information, and audio or video information, among others.

End user programming (EUP) can be described as an ability of an end user to control each and every aspect of behavior of an information-centric software application. EUP principles and components can be used to tailor and personalize automated information processing tasks performed by a software application or multiple applications under control of an end user. At least three interrelated ways exist for EUP principles and components to assist users.

In the first way, a potentially large number of processing steps that an end user normally would have to perform manually can be automated according to specific needs or desires of an end user. For example, an end user working with a large collection of digital images stored at a very high resolution can desire to create low resolution versions of these images for use in a web page. To do so manually, the end user typically would have to open each individual image in an editing program, create a low resolution copy according to various program settings, and save the low resolution version with a new file name or in a new location. An EUP module can be created to perform these tasks automatically upon addition of a new image to a specified directory.

In the second way of employing EUP principles, an EUP module can perform a significant amount of computation for the end user. For example, many search tasks are very computationally intensive, and an EUP module can automatically perform searches (and other computationally expensive tasks) and report results of the searches to the end user. Additionally or alternatively, an EUP module can perform such tasks when specifically invoked or executed by an end user. In the third way, an EUP module can function automatically without intervention from the end user, thereby allowing an end user to focus attention on other tasks instead of on a specific computing task. This automatic functioning can increase productivity of an end user by freeing the end user from manually performed, time-intensive tasks such as sorting electronic files and grouping such files into logical collections.

The EUP concepts and components presented herein provide a generalized and flexible platform upon which a wide variety of implementations can be created. Some possible implementations can provide a robust platform that can be used to support end user programming tasks across an entire platform such that every user application can access and benefit from end user programming functions. Other possible implementations can support such functionality for only a single application, and other implementations will fall somewhere between these two extremes. Those of ordinary skill in the art will readily recognize from reading this disclosure that many alterations and variations are possible.

End user programs can define all forms of computed actions presented in the examples herein, as well as other instances. One notable form includes association of an action with an event and can be referred to as an agent. An agent that involves synchronous events can include two special cases of interest. In the first case, such an agent can provide application customization by performing actions that can be intrinsic to the application. For example, a mail application can raise a synchronous event prior to sending a mail message. A resulting agent action can be to append a signature file to the message. When the action of the agent is a conditional action, the agent can choose the signature file based upon properties of the message. In the second case, constraints on data are involved. A data constraint agent can act to accept or deny a change to data that caused an event to be raised. For example, a change in ownership of a file can cause an event to be raised. The raised event can trigger an action of an agent that evaluates the ownership change. Based upon criteria such as identities of the present owner of the file, the new owner of the file, and the user effecting the change, the data constraint agent can accept or deny the change in ownership information.

More complex evaluations are possible with use of more sophisticated components. Such components can include various artificial intelligence components that can identify or match patterns or perform various classification tasks. Appropriate artificial intelligence components that can be used include neural networks and support vector machines, among others. The disclosed and described components (e.g., an agent created to perform filtering or management tasks) can employ these various artificial intelligence-based schemes to carry out programmed tasks. For instance, identification of a complex data pattern and a classification of a new datum as belonging to a data set that has the complex data pattern can be carried out by a neural network, a rules-based processing component, or an SVM.

A classifier is a function that maps an input attribute vector, $X=(x_1, x_2, x_3, x_4, \ldots x_n)$, to a confidence that the input belongs to a class, that is, $f(X)=confidence(class)$. Such a classification can employ a probabilistic and/or statistical-based analysis (for example, factoring into the analysis utilities and costs) to prognose or infer an action that a user desires to be automatically performed. In the case of an end user programming system, data items can be classified by examining attributes of those data items. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information, . . . ). For example, SVMs are configured by a learning or training phase within a classifier constructor and feature selection module. Thus, the classifier(s) can be used to automatically perform a number of functions including but not limited to determining whether a device should be sent data.

FIG. 11 is a schematic block diagram of a sample-computing environment 1100 with which the disclosed and described components and processes can interact. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The servers 1120 can house threads or processes to perform transformations by employing the disclosed and described components and processes, for example.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on a computer-readable storage medium for automating data processing, comprising:
    an end-user programming module that provides access to application-level controls and is integrated with an underlying file system that comprises a schema for developer code and a schema for end-user code, the end-user programming module maps an event of a computing system to at least one application-level action that is defined by an end user;
    a binding between the developer schema and the end-user schema that determines whether at least one application-level component of the developer schema is available as part of the end-user schema;
    a rules layer coupled with the end-user programming module comprising predefined application-level components for defining at least the application-level action; and
    an event handler that responds to the event and causes the at least one application-level action to be performed in response to an occurrence of the event.

2. The system of claim 1, the event is created by at least one of an operating system, a monitor application or a user application.

3. The system of claim 1, the automatic action is performed by a second user application that is different from the user application that created the event.

4. The system of claim 1, wherein the file system is a distributed file system that is distributed across a networked plurality of cooperating storage devices.

5. The system of claim 1, the pre-defined application level components comprise at least one of an application-level query, batch function, or agent.

6. The system of claim 1, the pre-defined application level components facilitate filtering or searching data within the file system and presenting the filtered or searched data as a result of the application-level action.

7. A computer-executable method for automatically processing data, comprising:
    employing at least one processor to implement the following computer-executable instructions:
        identifying a trigger event on a computing system that can be used to initiate a user-defined action on data in an integrated file system, and produce an automatic result in an application-level program, the integrated file system comprises a schema for developer code and a schema for end-user code;
        generating a binding between the developer schema and the end-user schema that determines whether at least one application-level component of the developer schema is available as part of the end-user schema;
        specifying an end-user defined action related to the application-level program to be taken upon detection of the identified event; and
        automatically performing the end-user defined action upon detecting the occurrence of the identified event.

8. The method of claim 7, the trigger event is an event that is created by at least one of an operating system, a monitor application, or a user application.

9. The method of claim 7, automatically performing the end-user defined action is performed by at least one of an operating system, a monitor application, or a user application.

10. The method of claim 7, further comprising:
    accessing a data store to obtain processing instructions for the end-user defined action.

11. The method of claim 10, accessing a data store includes accessing an integrated file system.

12. The method of claim 11, accessing an integrated file system includes accessing a distributed file system.

13. A system for automatically processing data, comprising:
    means for identifying a trigger event on a computing system that can be used to initiate a user-defined action on data in an integrated file system, and produce an automatic result in an application-level program, the integrated file system comprises a schema for developer code and a schema for end-user code;
    means for generating a binding between the developer schema and the end-user schema that determines whether at least one application-level component of the developer schema is available as part of the end-user schema;
    means for specifying an end-user defined action related to the application-level program to be taken upon detection of the identified event; and
    means for automatically performing the end-user defined action upon detecting the occurrence of the identified event.

14. The system of claim 13, the trigger event is an event that is created by at least one of an operating system, a monitor application, or a user application.

15. The system of claim 13, the means for automatically performing the end-user defined action includes at least one of an operating system, a monitor application, or a user application.

16. The system of claim 13, further comprising:
    means for accessing a data store to obtain processing instructions for the end-user defined action.

17. The system of claim 13, the means for accessing a data store includes means for accessing an integrated file system.

18. The system of claim 17, wherein the means for accessing an integrated file system includes means for connecting to a remote file system.

* * * * *